United States Patent [19]

Vargiu et al.

[11] 3,876,615

[45] Apr. 8, 1975

[54] PROCESS FOR THE PREPARATION OF GLYCIDYL ETHERS OF BISPHENOLS

[75] Inventors: Silvio Vargiu, Sesto S/Giovanni (Milan); Mario Pitzalis, Arcore (Milan); Giancarlo Crespolini, Bergamo, all of Italy

[73] Assignee: Societa Italiana Resine S.I.R. S.p.A., Milan, Italy

[22] Filed: Dec. 11, 1972

[21] Appl. No.: 313,918

[30] Foreign Application Priority Data

Dec. 27, 1971 Italy ................................. 32959/71

[52] U.S. Cl. ........................... 260/47 EP; 260/348.6
[51] Int. Cl. ............................................. C08g 30/04
[58] Field of Search ......... 260/47 EP, 348.6, 348 C, 260/348 R

[56] References Cited

UNITED STATES PATENTS

| 2,901,462 | 8/1959 | Anderson et al. ................... 260/47 |
| 3,145,191 | 8/1964 | Perfetti ........................ 260/348.6 X |

*Primary Examiner*—Melvin Goldstein
*Assistant Examiner*—T. Pertilla
*Attorney, Agent, or Firm*—Sughrue, Rothwell, Mion, Zinn and Macpeak

[57] ABSTRACT

Modified liquid epoxy resins of improved viscosity are obtained by reacting bisphenol-A or other diphenols with epichlorohydrin in the presence of polyglycols.

9 Claims, No Drawings

PROCESS FOR THE PREPARATION OF GLYCIDYL ETHERS OF BISPHENOLS

The present invention relates to an improved process for the preparation of glycidyl ethers of bisphenols, more particularly to those processes in which bisphenol-A is caused to react with an excess of epichlorohydrin in the presence of an inorganic base.

It is known that in the reaction of bisphenol-A (2,2'-bis [4-hydroxyphenyl] propane) with an excess of epichlorohydrin (with a molar ratio of bisphenol-A to epichlorohydrin equal to approximately 1:10) in the presence of approximately 2 moles of sodium hydroxide to each mole of bisphenol, products of reaction are obtained with an epoxy equivalent ranging over approximately 180 to 200, which essentially correspond to the diglycidyl ether of bisphenol-A.

Such products of reaction are normally called "liquid epoxy resins" and therefore this term will be used in the course of the present description.

Liquid epoxy resins constitute greatly esteemed products which find a vast number of applications in industry.

For this purpose, it will be sufficient to record their use in the field of varnishes and coatings in general such as for example road surfacings, or in the field of adhesives.

Such liquid epoxy resins are not however completely satisfactory, above all on account of the high levels of their viscosity.

In fact, the currently known commercial products have viscosity levels which normally range from about 15,000–16,000 cps when the viscosity is measured at a temperature of 25°C.

Such high levels of viscosity cause above all disadvantages and difficulties in the processing and utilisation of the resins themselves.

Furthermore, such liquid epoxy resins tolerate a relatively limited quantity of inert fillers and thus are disadvantageous for those applications in which the resins are used with such fillers.

It has now been found possible to eliminate or at least substantially to reduce the disadvantages of the prior art and to prepare liquid epoxy resins having viscosity values which fall within an unusually low range.

According to the process of the present invention, small quantities of one or more polyglycols of high molecular weight are added to the medium in which the bisphenol-A reacts with the epichlorohydrin in excess, in the presence of an inorganic base.

The term polyglycols of high molecular weight means those products having a molecular weight ranging from 200 to 800, the said polyglycols being chosen in the following classes: polyethylene glycol, polypropylene glycol and mixed polyethylene-polypropylene glycol or the monoether of this latter.

More particularly, polyethylene glycol is understood to be the product having the following general formula:

$$HO(CH_2-CH_2O)_nH$$

The said polyethylene glycol is obtained commercially by the addition of ethylene oxide to water, to ethylene glycol or diethylene glycol, the reaction being catalysed by small quantities of sodium hydroxide. Polypropylene glycol has the following general formula:

$$HO(C_3H_6O)_nH$$

and is obtained commercially by the addition of propylene oxide to water, propylene glycol or dipropylene glycol.

In this case, too, the process is performed in the presence of sodium hydroxide which is the catalyst.

The mixed polyethylene polypropylene glycol and its relative monoether have the general formula:

$$RO(CH_2-CH_2O)_x(C_3H_6O)_yH$$

in which R represents hydrogen or an alkyl respectively.

The said mixed glycol and the relative monoether are produced commercially in a manner similar to the production of ethylene or propylene glycol from the oxides of ethylene and propylene.

According to the process of the present invention, one or more of the glycols described are added to the medium in which the bisphenol-A and the epichlorohydrin react in the presence of an inorganic base.

It has been found that the objects of the present invention are achieved when the polyglycol or the mixture of polyglycols is added to the reaction medium in a quantity of 0.5 to approximately 25 parts by weight for every 100 parts by weight of bisphenol-A.

In fact, for values below 0.5, no appreciable advantages are obtained with regard to the values of viscosity of the liquid epoxy resins.

Furthermore, it is not advisable to go beyond values of polyglycol or mixture of polyglycols of more than 25 in that no appreciable advantages are obtained thereby and it is possible even to compromise some of the properties of the liquid polyester resins.

The best results are obtained with a concentration of polyglycol, or mixture of polyglycol, ranging from 1.5 to 7.0 parts by weight for every 100 parts of weight of bisphenol-A.

By working according to the process of the present invention, liquid epoxy resins are obtained which have viscosity values ranging from approximately 4,000 to approximately 12,000 cps, when the molar ratios of epichlorohydrin to bisphenol-A supplied to the reaction medium are maintained at between 8:1 and 10:1 and when the process is conducted in the presence of an inorganic base in a quantity ranging from 2.0 to 2.5 moles to every mole of bisphenol-A. Obviously it is possible, although not convenient, to work with a ratio of epichlorohydrin to bisphenol in excess of 10:1.

Furthermore, the preferred inorganic bases are sodium hydroxide and potassium hydroxide.

The other conditions of the reaction between bisphenol-A and epichlorohydrin are those known in the prior art for the preparation of liquid epoxy resins.

Thus, for example, it is possible to add the concentrated aqueous solution of inorganic base to the solution of bisphenol-A in an excess of epichlorohydrin at rates and temperatures such that the water introduced with the alkali is distilled azeotropically with the epichlorohydrin.

In this case, the heavy phase consisting of the epichlorohydrin is separated from the distillate and the said heavy phase may be recycled to the reaction medium. Alternatively, the reaction of bisphenol-A with the epichlorohydrin may take place in a range of temperatures within which there is no substantial boiling of the reagent, even though in general it will not be suitable to go below approximately 80°C.

In any case, at the end of the reaction, the unreacted epichlorohydrin will be separated, generally by distillation, and from the residue of distillation, the alkali metal chloride which is a by-product of the reaction will be separated off. In this phase, it is possible to work with the epoxy resin dissolved in an appropriate solvent, generally toluene.

At the end, the solvent is separated from the epoxy resin. In the preferred form, the polyglycol or mixture of polyglycols, is added completely at the commencement of reaction between the bisphenol-A and the epichlorohydrin. It is also possible to add the polyglycol or mixture of polyglycols wholly or partly during the course of the reaction of the bisphenol-A with the epichlorohydrin.

By working according to the process of the present invention, it is possible firstly to obtain liquid epoxy resins having unusually low viscosity levels, which is surprising due to the small quantities of polyglycols used.

The reasons why resins of low viscosity are obtained by means of the polyglycols used according to the process of the present invention are not completely known.

We feel however that such polyglycols participate in the reaction; in fact, useful results are not obtained when the polyglycols themselves are added to the preformed liquid epoxy resin.

In other words, by adding the polyglycol or mixture of polyglycols to the liquid epoxy resin in the quantities which are defined hereinabove, a mixture is obtained which has low levels of viscosity, while the hardened products obtained from the said mixture have undesirable characteristics. It should be noted that the use of the polyglycols according to the process of the present invention not only permits a lowering of the viscosity of the liquid epoxy resin but does not have a negative influence on the other characteristics of the resins themselves.

Even an improvement may be noted in some properties of the resins, such as for example the impact resistance of the relative hardened products.

The epoxy resins of the present invention are useful for all the purposes for which liquid epoxy resins are normally intended.

With regard to the products of the prior art, the resins of the present invention have above all the advantages relative to greater ease of processing and utilisation, and this in relation to the low levels of viscosity.

Another advantage resides in the fact that the resins of the present invention withstand greater quantities of inert fillers than do similar products of the prior art.

In the foregoing description, reference has been made to those products of condensation which are obtained by reaction of bisphenol-A with epichlorohydrin in excess and in the presence of an inorganic base.

However, the advantages of the process of the present invention are obtained also in the reaction of epichlorohydrin with diphenols other than bisphenol-A. Examples of such phenols are: resorcinol, catechol, hydroquinone, methyl resorcinol etc.

In the following examples of experiments, the liquid epoxy resin is prepared in the following manner. The bisphenol-A, the epichlorohydrin and the polyglycols are filled into a flask fitted with an agitator, thermometer, distiller and a system for the introduction of inert gas.

The mass is then heated under agitation to a temperature of 90° – 95°C while an inert atmosphere is maintained. At this temperature, sodium hydroxide in aqueous solution is added, the quantity being so measured out that the solution is added over approximately 6 hours.

During the addition of the aqueous sodium hydroxide, the water is azeotropically distilled with the epichlorohydrin. At the end of addition of the aqueous sodium hydroxide, the mixture is maintained under reflux for approximately 30 minutes. The unchanged epichlorohydrin is then distilled at a pressure below atmospheric pressure, and after cooling, an organic solvent is added to the residue of distillation to bring into solution the liquid epoxy resin which has thus been separated from the salt which is a by-product of the reaction.

Finally, the organic solvent is distilled off and the liquid epoxy resin recovered.

EXAMPLE 1

By following the procedures described in the above text, liquid epoxy resin is prepared from 684 parts by weight of bisphenol-A, 2275 parts by weight of epichlorohydrin and 496 parts by weight of aqueous sodium hydroxide (sodium hydroxide concentration approximately 50% by weight).

In the solubilisation of the liquid epoxy resin in order to separate it from the sodium chloride which is a by-product of the reaction, toluene is used in a quantity equal to approximately 1200 parts by weight.

After distillation of the toluene, the liquid epoxy resin is recovered, clear in aspect, its characteristics being listed in Table 1.

EXAMPLE 2

The same procedure is adopted as in Example 1, 15 parts by weight of polyethylene glycol (molecular weight 400) together with bisphenol-A and epichlorohydrin being used. A liquid epoxy resin of clear aspect is obtained, the characteristic features of which are shown in Table 1.

EXAMPLE 3

The same procedure is adopted as in Example 1, 30 parts by weight of polyethylene glycol (molecular weight 400) being used together with bisphenol-A and epichlorohydrin. A liquid epoxy resin of clear appearance is obtained, its characteristics being listed in Table 1.

EXAMPLE 4

The same procedure is adopted as in Example 1, 60 parts by weight of polyethylene glycol (molecular weight 400) being used, together with bisphenol-A and epichlorohydrin. A liquid epoxy resin of clear appearance is obtained, its characteristics being listed in Table 1.

Table 1

| Characteristics resin | Example 1 | Example 2 | Example 3 | Example 4 |
|---|---|---|---|---|
| Viscosity in cps at 25°C | 15,500 | 11,600 | 7,200 | 5,500 |
| Epoxy equivalent | 185 | 185 | 190 | 190 |
| "Pot life" | 60 mins. | 60 mins. | 70 mins. | 75 mins. |

Table 1—Continued

| Characteristics | Example | Example | Example | Example |
|---|---|---|---|---|
| Viscosity in cps at 25°C (after 4 hrs. at 120°C) | 15,500 | 11,600 | 7,200 | 5,500 |

Table 1 shows the levels of viscosity in cps at 25°C of the liquid epoxy resins obtained in Examples 1 to 4 and of the same resins after being heated to 120°C for 4 hours.

Also shown are the values of epoxy equivalent and "pot life."

The "pot life" or workability time is determined at 25°C with an homogenised mixture containing 100 parts by weight of liquid epoxy resin for every 11 parts by weight of the hardener constituted by triethylene tetramine.

EXAMPLE 5

100 parts by weight of the liquid epoxy resin obtained as described in Example 2 are homogenised with 11 parts by weight of triethylene tetramine and specimens are made up for determination of the characteristic features of the hardened products.

More particularly, the liquid epoxy resin is heated at 40°–50°C in a nitrogen atmosphere. Then, the amine hardener is added and the mixture stirred mechanically for 4 minutes, a nitrogen ambient still being maintained.

The resin-hardener mixture is then poured into metal moulds.

In order to allow separation of the resin from the moulds, the surfaces of these latter are pre-treated with separating wax and polyvinyl alcohol.

Pouring of the mixture of resin and hardener is carried out once the separating media are completely dried. After 24 hours from pouring, the specimens are removed from the moulds and are kept for 6 hours in a thermostatically-controlled ambient at 90°C.

The tests listed in Table 2 are then carried out on the specimens.

EXAMPLES 6 and 7

The same procedure is adopted as in Example 5 using the liquid epoxy resins obtained in Examples 3 and 4 respectively. The results of these tests are set out in Table 2. More particularly, the said table lists the values for:
— Bending strength in kg/sq.cm, measured by the UNI 4274 method;
— Tensile strength in kg/sq.cm, measured by the UNI 4280 method;
— Impact resistance in kg/cm/sq.cm, measured by the UNI 4276 method;
— Elasticity modulus in kg/sq.cm, measured by the UNI 4275 method;
— H.D.T. in degrees centigrade, measured by the ASTM D 648 method;
— Martens in degrees centigrade, measured by the UNI 4281 method;
— Water absorption as a percentage by weight, measured by the ASTM D 570 method.

Table 2

| Characteristics of specimens | Example 5 | Example 6 | Example 7 |
|---|---|---|---|
| Bending strength | 726 | 760 | 744 |
| Tensile stength | 360 | 360 | 392 |
| Impact resistance | 4.7 | 5.7 | 5.8 |
| Elasticity modulus | $37.7 \times 10^3$ | $27.5 \times 10^3$ | $34.2 \times 10^3$ |
| H.D.T. | 58 | 51 | 54 |
| Martens | 57 | 49.5 | 54 |
| Water absorption | 0.19 | 0.24 | 0.24 |

EXAMPLE 8

1,000 parts by weight of the liquid epoxy resin obtained as in Example 1 are mixed and homogenised with 16 parts by weight of polyethylene glycol with a molecular weight of 400.

In this way, a liquid mixture is obtained which is clear at ambient temperature and even at −10°C, the characteristics of which are listed in Table 3.

EXAMPLE 9

1,000 parts by weight of the liquid epoxy resin are obtained as in Example 1 are mixed and homogenised with 31.5 parts by weight of polyethylene glycol with a molecular weight of 400.

In this way, a liquid mixture is obtained which is clear at ambient temperature and also at −10°C, the characteristics of which are set out in Table 3.

Table 3

| Characteristics of mixture | Example 8 | Example 9 |
|---|---|---|
| Viscosity in cps at 25°C | 10,700 | 6,700 |
| Epoxy equivalent | 186 | 190 |
| "Pot life" | 58 | 58 |

The pot life was determined by the procedures described previously.

EXAMPLE 10

100 parts by weight of the liquid epoxy resin and polyethylene glycol mixture of Example 8 were homogenised with 11 parts by weight of triethylene tetramine and samples were prepared as described hereinabove. The tests listed in Table 4 were carried out on these samples.

EXAMPLE 11

The procedure is adopted as in Example 10 with the liquid epoxy resin and polyethylene glycol mixture described in Example 9.

The results are listed in Table 4.

Table 4

| Characterics of samples | Example 10 | Example 11 |
|---|---|---|
| Bending strength | 323 | 337 |
| Tensile strength | 272 | 258 |
| Impact resistance | 1.5 | 3.2 |
| Elasticity modulus | $32 \times 10^3$ | $30.3 \times 10^3$ |
| Martens | 52 | 42 |
| Water absorption, % by weight | 0.24 | 0.24 |

What we claim is:

1. Process for the preparation of liquid epoxy resins by reaction of bisphenol-A with epichlorohydrin in excess, in the presence of an inorganic base, characterised in that the said reaction is carried out in the presence of a quantity of 0.5 to 25 parts by weight for every 100 parts by weight of bisphenol-A of polyethylene glycol or the relative monoether, the said polyethylene glycol having a molecular weight of 200 to 800.

2. Process according to claim 1, characterised in that a quantity of polyethylene glycol of 1.5 to 7 parts by weight for every 100 parts by weight of bisphenol-A is used.

3. Process according to claim 1, characterised in that molar ratios of epichlorohydrin to bisphenol-A of 8:1 to 10:1 are used, the inorganic base ranging in quantity from 2.0 to 2.5 moles for every mole of bisphenol-A.

4. Process according to claim 1, characterised in that sodium hydroxide or potassium hydroxide is used as the inorganic base.

5. Process according to claim 1, characterised in that the working temperatures used are those at which boiling occurs in the reaction medium.

6. Process according to claim 1, characterised in that the working temperatures are below those at which boiling occurs in the reaction mixture, the said temperatures being above approximately 80°C.

7. A process as claimed in claim 1 wherein the bisphenol-A is replaced by another diphenol reactive with epichlorohydrin.

8. A process as claimed in claim 7, wherein the other diphenol is resorcinol, catechol, hydroquinone or methyl resorcinol.

9. The process of claim 1 wherein the liquid epoxy resin has an epoxy equivalent up to about 190.

* * * * *